US012516933B2

(12) United States Patent
Ding (10) Patent No.: US 12,516,933 B2
(45) Date of Patent: Jan. 6, 2026

(54) MEMS DEVICE (71) Applicant: Zhunmao (Hangzhou) Technology Co., Hangzhou (CN)

(72) Inventor: Haitao Ding, Hangzhou (CN)

(73) Assignee: Zhunmao (Hangzhou) Technology Co., Hangzhou (CN)

( * ) Notice: Subject to any disclaimer, the term of this patent is extended or adjusted under 35 U.S.C. 154(b) by 381 days.

(21) Appl. No.: 18/358,125

(22) Filed: Jul. 25, 2023

(65) Prior Publication Data

US 2024/0027192 A1 Jan. 25, 2024

(30) Foreign Application Priority Data

Jul. 25, 2022 (CN) .......................... 202210875783.2

(51) Int. Cl.
*G01P 15/125* (2006.01)
*G01C 19/5712* (2012.01)
*G01P 1/00* (2006.01)

(52) U.S. Cl.
CPC ............ *G01C 19/5712* (2013.01); *G01P 1/00* (2013.01); *G01P 15/125* (2013.01)

(58) Field of Classification Search
CPC ........................ G01C 19/5712; G01C 19/5776; G01C 19/56; G01P 1/00; G01P 15/125; G01P 2015/0814; G01D 5/2417
See application file for complete search history.

(56) References Cited

U.S. PATENT DOCUMENTS 5,194,819 A * 3/1993 Briefer ...................... G01G 7/06
324/684
5,281,901 A * 1/1994 Yardley .................. G01C 19/56
318/587

(Continued)

FOREIGN PATENT DOCUMENTS

CN 1948906 A 4/2007
CN 103308720 A 9/2013

(Continued)

OTHER PUBLICATIONS

Translation of Chinese Office Action for Chinese Application No. 2022108757932, dated May 21, 2024, 14 pages.

(Continued)

*Primary Examiner* — David J Bolduc
(74) *Attorney, Agent, or Firm* — Westman, Champlin & Koehler, P.A.

(57) ABSTRACT

Disclosed is a MEMS device, comprising: a movable electrode plate; a first electrode plate and a third electrode plate on a first side of the movable electrode plate; a second electrode plate and a fourth electrode plate on a second side of the movable electrode plate. The first electrode plate, the second electrode plate, the third electrode plate and the fourth electrode plate respectively form a first capacitor, a second capacitor, a third capacitor, a fourth capacitor with the movable electrode plate, the first capacitor and the second capacitor are connected to a detection circuit, the third capacitor and the fourth capacitor are connected to a reference circuit, an output of the detection circuit and an output of the reference circuit are connected to an input of a divider for eliminating nonlinear relationship between the output voltage of the detection circuit and the displacement of the movable electrode plate.

12 Claims, 6 Drawing Sheets

(56) References Cited

U.S. PATENT DOCUMENTS

| | | | |
|---|---|---|---|
| 5,451,940 A * | 9/1995 | Schneider | G01L 9/0072 |
| | | | 340/870.37 |
| 5,540,095 A | 7/1996 | Sherman et al. | |
| 6,323,660 B1 * | 11/2001 | Kunc | G01P 15/131 |
| | | | 324/661 |
| 6,386,032 B1 | 5/2002 | Lemikin et al. | |
| 6,868,726 B2 * | 3/2005 | Lemkin | G01P 15/125 |
| | | | 73/514.32 |
| 7,401,515 B2 | 7/2008 | Weber | |
| 2001/0032508 A1 * | 10/2001 | Lemkin | G01P 15/125 |
| | | | 73/514.32 |
| 2005/0218911 A1 | 10/2005 | Denison | |
| 2008/0173091 A1 | 7/2008 | McNeil et al. | |
| 2011/0174074 A1 * | 7/2011 | Li | G01P 15/125 |
| | | | 73/504.14 |
| 2013/0006559 A1 * | 1/2013 | Grosjean | G01P 15/125 |
| | | | 702/65 |
| 2014/0210547 A1 * | 7/2014 | Tomioka | G06G 7/186 |
| | | | 330/9 |
| 2017/0089947 A1 | 3/2017 | Townsend et al. | |
| 2018/0364275 A1 * | 12/2018 | Tao | H03G 3/008 |
| 2022/0224348 A1 * | 7/2022 | Perrott | H03L 7/093 |

FOREIGN PATENT DOCUMENTS

| | | |
|---|---|---|
| CN | 103986472 A | 8/2014 |
| CN | 104596496 A | 5/2015 |
| CN | 104614552 A | 5/2015 |
| CN | 107085124 A | 8/2017 |
| CN | 108362910 A | 8/2018 |
| CN | 112600543 A | 4/2021 |
| CN | 113534109 A | 10/2021 |
| CN | 114280330 A | 4/2022 |
| CN | 114509579 A | 5/2022 |
| CN | 115201516 A | 10/2022 |
| CN | 117490732 A | 2/2024 |
| TW | 200828779 A | 7/2008 |

OTHER PUBLICATIONS

Translation of Chinese Office Action for Chinese Application No. 2022108753282, dated May 17, 2025, 24 pages.

Ding et al., A High-Resolution Silicon-on-Glass Z Axis Gyroscope Operating at Atmospheric Pressure, IEEE Sensors Journal, vol. 10, No. 6, p. 1066-1074, 2010.

Lui et al., Design and Fabrication of a lateral axis Gyroscope with Asymmetric Comb-Fingers as Sensing Capacitors, Proceedings of the 1st IEEE International Conference on Nano/Micro Engineered and Molecular Systems, p. 762-765, 2006.

US Office Action for U.S. Appl. No. 18/358,133, dated Sep. 22, 2025, 20 pages.

* cited by examiner

- prior art -

Fig. 1

- prior art -

MEMS DEVICE

CROSS-REFERENCE TO RELATED APPLICATION

The present application claims priority to Chinese patent application No. 202210875783.2, filed on Jul. 25, 2022, and entitled "MEMS DEVICE", which is incorporated herein by reference in its entirety.

FIELD OF THE DISCLOSURE

The present disclosure relates to a technical field of semiconductor technologies, in particular to a MEMS device.

DESCRIPTION OF THE RELATED ART

Parallel plate capacitors are easy to be fabricated, have high sensitivity, wide temperature range, are capable to respond to DC signals, and have little change after impact, thus they are widely used in designs of Micro-Electro-Mechanical System (MEMS) sensors. In order to suppress a common mode signal and ensure symmetry of a scale factor, a differential parallel plate capacitor has more practicality. However, capacitance change of a parallel plate capacitor is nonlinear with a displacement between the parallel plates of the capacitor, thus signal detection is also nonlinear; and with an increase of the displacement between the parallel plates of the capacitor, nonlinearity also increases, which seriously affects detection accuracy.

SUMMARY

In view of the above problems, an objective of the present disclosure is to provide a MEMS device, so as to eliminate nonlinearity of parallel plate capacitor detection.

According to embodiments of the present disclosure, a MEMS device is provided, and comprises:
  a movable electrode plate;
  a first electrode plate and a third electrode plate, both of which are located on a first side of the movable electrode plate, wherein a first capacitor is formed by the first electrode plate and the movable electrode plate, and a third capacitor is formed by the third electrode plate and the movable electrode plate; and
  a second electrode plate and a fourth electrode plate, both of which are located on a second side of the movable electrode plate, wherein a second capacitor is formed by the second electrode plate and the movable electrode plate, and a fourth capacitor is formed by the fourth electrode plate and the movable electrode plate;
  wherein the first capacitor and the second capacitor are coupled to a detection circuit, and the detection circuit is configured to perform differential detection on the first capacitor and the second capacitor;
  wherein the third capacitor and the fourth capacitor are coupled to a reference circuit, and the reference circuit is configured to detect the third capacitor and the fourth capacitor;
  wherein an output terminal of the detection circuit and an output terminal of the reference circuit are connected to an input terminal of a divider configured to eliminate a nonlinear relationship between an output voltage of the detection circuit and a displacement of the movable electrode plate.

In some optional embodiments, distance between the first electrode plate and the movable electrode plate, distance between the second electrode plate and the movable electrode plate, distance between the third electrode plate and the movable electrode plate, and distance between the fourth electrode plate and the movable electrode plate are equal when the movable electrode plate is in a nominal position.

In some optional embodiments, each of the first electrode plate and the second electrode plate has an equal overlapped area to the movable electrode plate; and each of the third electrode plate and the fourth electrode plate has an equal overlapped area to the movable electrode plate.

In some optional embodiments, the detection circuit comprises:
  a first operational amplifier, having an inverting input terminal connected to the first electrode plate;
  a second operational amplifier, having an inverting input terminal connected to the second electrode plate;
  a third operational amplifier, having a non-inverting input terminal, an inverting input terminal and an output terminal, wherein the non-inverting input terminal of the third operational amplifier is connected to an output terminal of the second operational amplifier, the inverting input terminal of the third operational amplifier is connected to an output terminal of the first operational amplifier, and the output terminal of the third operational amplifier is connected to the input terminal of the divider; and
  a first feedback capacitor, coupled between the inverting input terminal and the output terminal of the first operational amplifier;
  a second feedback capacitor, coupled between the inverting input terminal and the output terminal of the second operational amplifier;
  wherein, capacitance values of the first feedback capacitor and the second feedback capacitor are equal.

In some optional embodiments, the reference circuit comprises:
  a fourth operational amplifier, having an inverting input terminal connected to the third electrode plate and the fourth electrode plate, and having an output terminal connected to the divider; and
  a third feedback capacitor, coupled between the inverting input terminal and the output terminal of the fourth operational amplifier.

In some optional embodiments, the MEMS device further includes a voltage source, which is connected to the movable electrode plate and configured to supply a voltage to the first capacitor, the second capacitor, the third capacitor, and the fourth capacitor.

In some optional embodiments, the first electrode plate and the third electrode plate are separated from each other or connected through an insulating medium.

In some optional embodiments, the second electrode plate and the fourth electrode plate are separated from each other or connected through an insulating medium.

In some optional embodiments, the MEMS device is a MEMS accelerometer.

In some optional embodiments, the MEMS device is a MEMS gyroscope.

In a MEMS device provided according to embodiments of the present disclosure, a reference capacitor is introduced into a MEMS sensing element and linked with a parallel plate detection capacitor, wherein, the parallel plate detection capacitor is coupled to a detection circuit, the reference capacitor is coupled to a reference circuit, and the output signal of the detection circuit and the output signal of the reference circuit are divided, thereby theoretically eliminating nonlinearity, which can be simply implemented and has strong feasibility.

Furthermore, in the MEMS device according to the embodiments of the present disclosure, the reference capacitor and the detection capacitor are identical in material, structure form and fabrication process, and have identical temperature coefficient, thus temperature drift of an output of the divider can be reduced.

Furthermore, the MEMS device according to embodiments of the present disclosure may be a micro-electro-mechanical accelerometer, a micro-electro-mechanical gyroscope or the like, and may have a wide application range.

BRIEF DESCRIPTION OF THE DRAWINGS

The above and other objects, features and advantages of the present disclosure will become more apparent from the following description of embodiments of the present disclosure with reference to accompanying drawings.

It should be apparent that the drawings described below relate only to some embodiments of the present disclosure and are not a limitation of the present disclosure. In the drawings.

DETAILED DESCRIPTION OF EMBODIMENTS OF THE DISCLOSURE

The present invention will be described in more detail below with reference to the accompanying drawings. Throughout the various figures, like elements are denoted by like reference numerals. For the sake of clarity, various parts in the drawings may not be drawn to scale. In addition, some well-known parts may not be shown.

The present disclosure may be presented in various forms, some examples of which will be described below.

Figure 1:
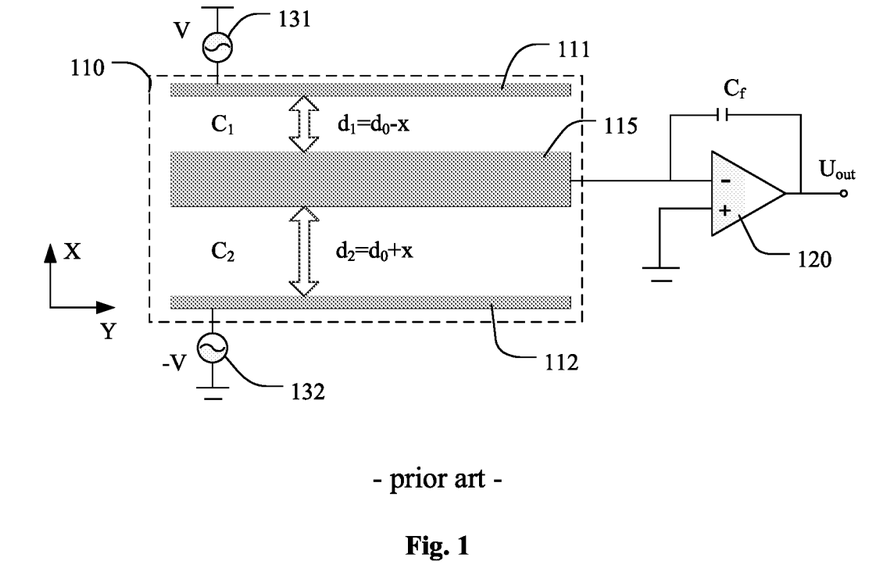
FIG. 1 shows an equivalent schematic diagram of a MEMS device according to the prior art.
Figure 2:
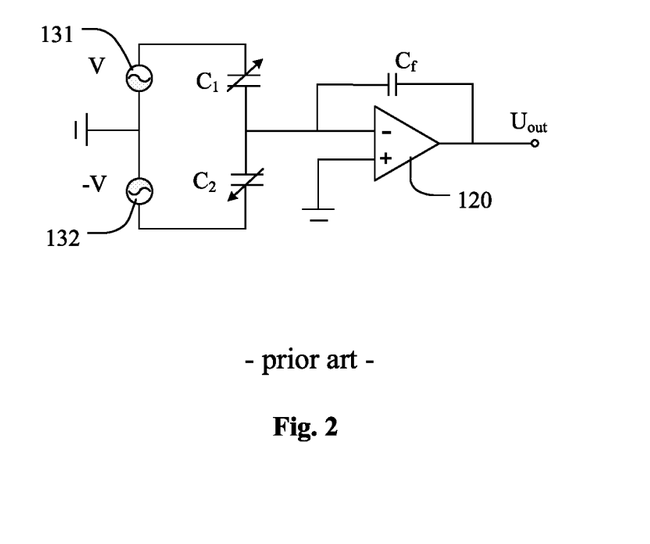
FIG. 2 shows an equivalent circuit diagram of a MEMS device according to the prior art.

FIG. 1 shows an equivalent schematic diagram of a MEMS device according to the prior art; FIG. 2 shows an equivalent circuit diagram of the MEMS device according to the prior art.

As shown in FIG. 1, the MEMS device 100 includes a parallel plate capacitor 110, an operational amplifier 120, a first voltage source 131 and a second voltage source 132 and a feedback capacitor $C_f$. The parallel plate capacitor 110 includes a movable electrode plate 115, a first electrode plate 111 on one side of the movable electrode plate 115, and a second electrode plate 112 on the other side of the movable electrode plate 115.

A first capacitor $C_1$ is constituted by the first electrode plate 111 and the movable electrode plate 115, and a second capacitor $C_2$ is constituted by the second electrode plate 112 and the movable electrode plate 115. When the movable electrode plate 115 is in the nominal position, the distance between the first electrode plate 111 and the movable electrode plate 115 and the distance between the second electrode plate 112 and the movable electrode plate 115 are both equal to $d_0$; the area, overlapped to the movable electrode plate 115, of the first electrode plate 111 and the area, overlapped to the movable electrode plate 115, of the second electrode plate 112 are both equal to $A_0$; that is, capacitance of the first capacitor $C_1$ and capacitance of the second capacitor $C_2$ are both equal to $C_0$. High frequency AC carriers provided by the first voltage source 131 and the second voltage source 132 are same in amplitude and are opposite in phase.

When the movable electrode plate 115 leaves the nominal position and is displaced along a first direction (e.g., X-axis direction), the distance between the movable electrode plate 115 and the first electrode plate 111 and the distance between the movable electrode plate 115 and the second electrode plate 112 change, thereby causing the capacitances of the first capacitor $C_1$ and the second capacitor $C_2$ to change.

Further, the movable electrode plate 115 is connected to an inverting input terminal of the operational amplifier 120, and the first electrode plate 111 is connected to the first voltage source 131, such that two ends of the first capacitor $C_1$ are connected between the first voltage source 131 and the inverting input terminal of the operational amplifier 120; the second electrode plate 112 is connected to the second voltage source 132, such that two ends of the second capacitor $C_2$ are connected between the second voltage source 132 and the inverting input terminal of the operational amplifier 120; the feedback capacitor $C_f$ is connected between the inverting input terminal and an output terminal of the operational amplifier 120, and the first capacitor $C_1$ and the second capacitor $C_2$ are connected to form an equivalent circuit shown in FIG. 2.

As shown in FIG. 2, an output voltage $U_{out}$ at the output terminal of the operational amplifier is:

$$U_{out} = -\frac{C_1 - C_2}{C_f} V$$

Wherein, when the movable electrode plate 115 is in the nominal position, the capacitance of the first capacitor $C_1$ and the capacitance of the second capacitor $C_2$ are equal, and the output voltage $U_{out}$ is 0.

When the movable electrode plate 115 is displaced along the first direction (e.g., X-axis direction), the capacitance of the first capacitor $C_1$ and the capacitance of the second capacitor $C_2$ may change. For example, when the movable electrode plate 115 is moved by a distance x, for example, in a direction toward the first electrode plate 111, the distance between the movable electrode plate 115 and the first electrode plate 111 is $d_0-x$, and the capacitance of the first capacitor $C_1$ is:

$$C_1 = \frac{\varepsilon A_0}{d_0 - x};$$

Wherein, $\varepsilon$ represents permittivity between the first electrode plate 111 and the movable electrode plate 115. Meanwhile, the distance between the movable electrode plate 115 and the second electrode plate 112 is $d_0+x$, and the capacitance of the second capacitor $C_2$ is:

$$C_2 = \frac{\varepsilon A_0}{d_0 + x};$$

Wherein $\varepsilon$ represents permittivity between the second electrode plate 112 and the movable electrode plate 115.

The output voltage $U_{out}$ at the output terminal of the operational amplifier 120 is:

$$U_{out} = -\frac{C_1 - C_2}{C_f}V = -\frac{\frac{\varepsilon A_0}{d_0 - x} - \frac{\varepsilon A_0}{d_0 + x}}{C_f}V = -\frac{2\varepsilon A_0 V}{C_f}\frac{x}{(d_0 + x)(d_0 - x)}$$

The feedback capacitor $C_f$ is an external fixed capacitor. From the above formula, it can be seen that the capacitance of parallel plate capacitor is changed with the distance nonlinearly, such that the output voltage is also changed with the distance nonlinearly, and with an increasing change of the distance, nonlinearity also increases, which seriously affects detection accuracy.

Figure 3:
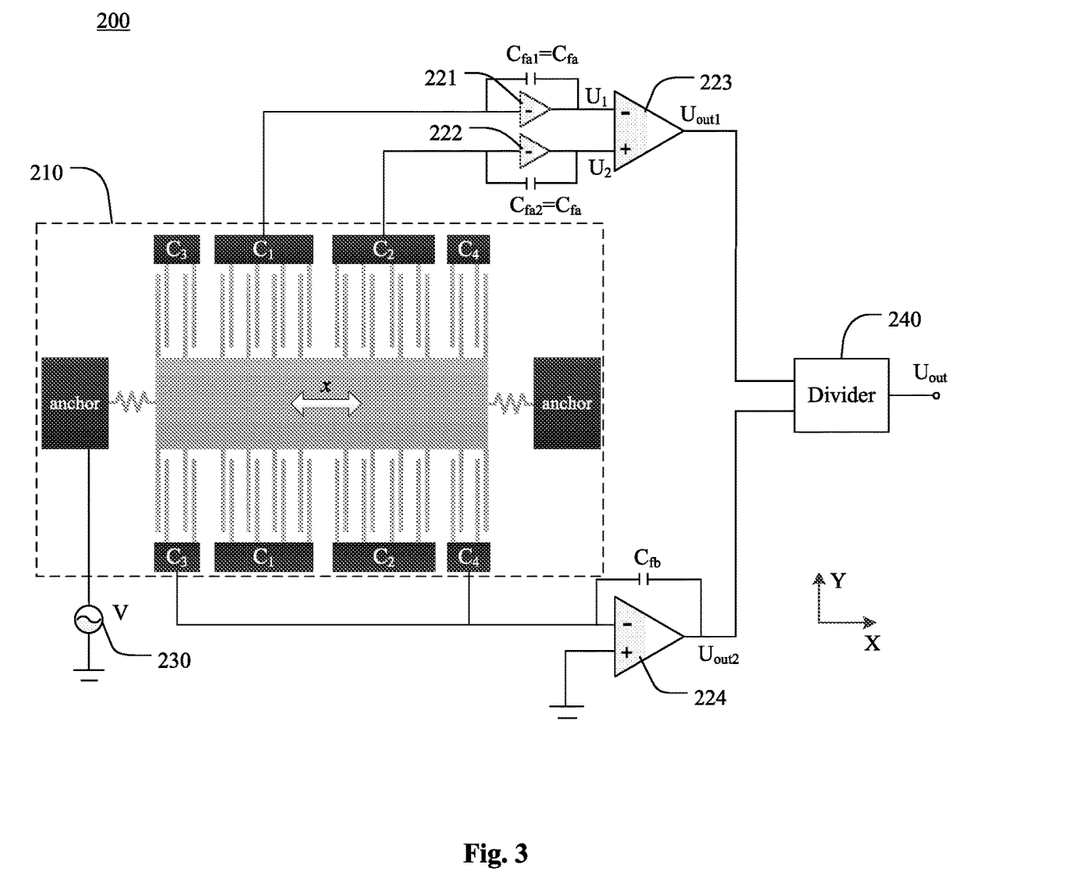
FIG. 3 shows a schematic diagram of a MEMS device according to a first embodiment of the present disclosure.

FIG. 3 shows a schematic diagram of a MEMS device according to a first embodiment of the present disclosure. In this embodiment, the MEMS device is, for example, a MEMS accelerometer. As shown in FIG. 3, the MEMS device 200 includes a sensing element 210, a first operational amplifier 221, a second operational amplifier 222, a third operational amplifier 223, a fourth operational amplifier 224, a first feedback capacitor $C_{fa1}$, a second feedback capacitor $C_{fa2}$, a third feedback capacitor $C_{fb}$, a voltage source 230, and a divider 240.

Figure 4:
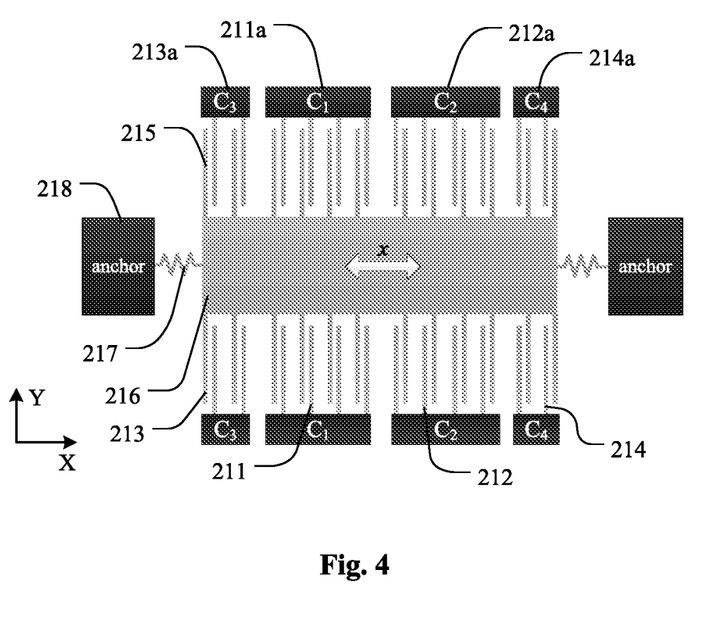
FIG. 4 shows a schematic structural diagram of the sensing element of the MEMS accelerometer according to the first embodiment of the present disclosure.
Figure 5:
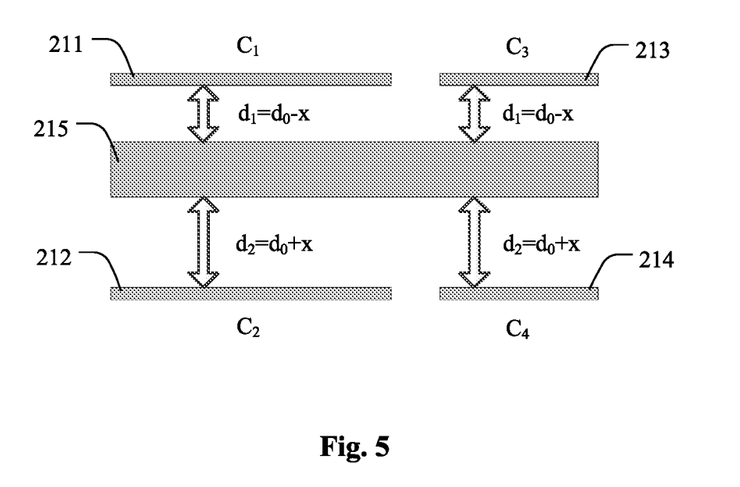
FIG. 5 shows a capacitive equivalent structural diagram of the sensing element of the MEMS accelerometer according to the first embodiment of the present disclosure.

FIG. 4 shows a schematic structural diagram of a sensing element of a MEMS accelerometer according to the first embodiment of the present disclosure; FIG. 5 shows a capacitive equivalent structure diagram of the sensing element according to the first embodiment of the present disclosure. As shown in FIGS. 4 and 5, the sensing element 210 includes a movable electrode plate 215, a first electrode plate 211, a second electrode plate 212, a third electrode plate 213 and a fourth electrode plate 214.

In this embodiment, there may be a plurality of movable electrode plates 215, and the plurality of movable electrode plates 215 are fixedly connected to a movable mass 216. Further, the movable mass 216 is a rectangular mass and the plurality of movable electrode plates 215 are perpendicular to the movable mass 216. Further, the movable mass 216 is connected to an anchor 218 through an elastic beam 217. When the MEMS acceleration sensing element 210 senses an acceleration, the movable mass 216 leaves the nominal position, the elastic beam deflects in a first direction (e.g., X-axis direction), and the movable mass 216 is displaced in the first direction (e.g., the X-axis direction), thereby driving the plurality of movable electrode plates 215 to move together in the first direction (e.g., the X-axis direction).

The first electrode plate 211, the second electrode plate 212, the third electrode plate 213, and the fourth electrode plate 214 are fixed electrode plates. In this embodiment, there are a plurality of first electrode plates 211, each of which is overlapped with a corresponding one of the plurality of the movable electrode plates 215, and the plurality of the first electrode plates 211 together with the corresponding ones of the plurality of movable electrode plates 215 constitute a first capacitor $C_1$. There are a plurality of second electrode plates 212, each of which is overlapped with a corresponding one of the plurality of the movable electrode plates 215, and the plurality of the second electrode plates 212 together with the corresponding ones of the plurality of movable electrode plates 215 constitute a second capacitor $C_2$. There are a plurality of third electrode plates 213, each of which is overlapped with a corresponding one of the plurality of the movable electrode plates 215, and the plurality of the third electrode plates 213 together with the corresponding ones of the plurality of movable electrode plates 215 constitute a third capacitor $C_3$. There are a plurality of fourth electrode plates 214, each of which is overlapped with a corresponding one of the plurality of movable electrode plates 215, and the plurality of the fourth electrode plates 214 together with the corresponding ones of the plurality of movable electrode plates 215 constitute a fourth capacitor $C_4$.

Each first electrode plate 211 is located on a first side of a corresponding movable electrode plate 215, each third electrode plate 213 is located on a first side of a corresponding movable electrode plate 215, each second electrode plate 212 is located on a second side of a corresponding movable electrode plate 215, and each fourth electrode plate 214 is located on a second side of a corresponding movable electrode plate 215. When the movable mass 216 is displaced to drive the movable electrode plates 215 close to the first electrode plates 211 and the third electrode plates 213, corresponding movable electrode plates 215 move away from the second electrode plates 212 and the fourth electrode plates 214; on the contrary, when the movable mass 216 is displaced to drive the movable electrode plates 215 away from the first electrode plates 211 and the third electrode plates 213, the corresponding movable electrode plates 215 move close to the second electrode plates 212 and the fourth electrode plates 214. When the movable mass 216 is displaced, the first capacitor $C_1$, the second capacitor $C_2$, the third capacitor $C_3$, and the fourth capacitor $C_4$ all change in capacitance.

When the movable mass 216 is in the nominal position, the distance between each first electrode plate 211 and a corresponding movable electrode plate 215, the distance between each second electrode plate 212 and a corresponding movable electrode plate 215, the distance between each third electrode plate 213 and a corresponding movable electrode plate 215, and the distance between each fourth electrode plate 214 and a corresponding movable electrode plate 215 are equal. The overlapped area of each first electrode plate 211 with a corresponding movable electrode plate 215, the overlapped area of each second electrode plate 212 with a corresponding movable electrode plate 215, the overlapped area of each third electrode plate 213 with a corresponding movable electrode plate 215, and the overlapped area of each fourth electrode plate 214 with a corresponding movable electrode plate 215, are equal. The number of the first electrode plates 211 is equal to the number of the second electrode plates 212. When the movable mass 216 is in the nominal position, capacitance values of the first capacitor $C_1$ and the second capacitor $C_2$ are equal, and for example, equal to $C_0$; the number of the third electrode plates 213 is equal to the number of the fourth electrode plates 214. When the movable mass 216 is in the nominal position, capacitance values of the third capacitor $C_3$ and the fourth capacitor $C_4$ are equal, and for example, equal to $C_{01}$. Capacitance values of the first feedback capacitor $C_{fa1}$ and the second feedback capacitor $C_{fa2}$ are equal, and for example, equal to $C_{fa}$.

The plurality of first electrode plates 211 are fixedly connected to one or more first fixed electrode 211a, wherein when there are a plurality of first fixed electrodes 211a, the plurality of first fixed electrodes 211a are short-circuited with each other. The plurality of second electrode plates 212 are fixedly connected to one or more second fixed electrode 212a, wherein when there are a plurality of second fixed electrodes 212a, the plurality of second fixed electrodes 212a are short-circuited with each other. The plurality of third electrode plates 213 are fixedly connected to one or more third fixed electrode 213a, wherein when there are a plurality of third fixed electrodes 213a, the plurality of third fixed electrodes 213a are short-circuited with each other. The plurality of fourth electrode plates 214 are fixedly connected to one or more fourth fixed electrode 214a, wherein when there are a plurality of fourth fixed electrodes 214a, the plurality of fourth fixed electrodes 214a are short-circuited with each other.

Figure 6:
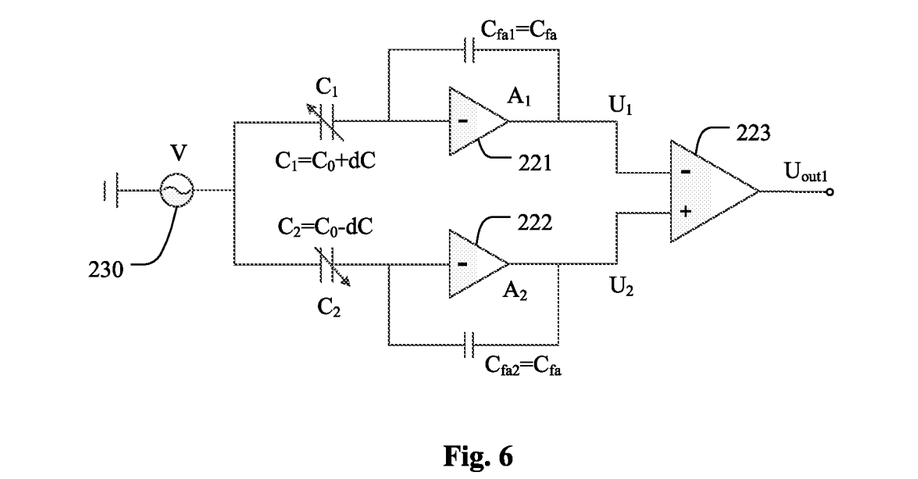
FIG. 6 shows an equivalent circuit diagram of a detection circuit of the MEMS device according to the first embodiment of the present disclosure.
Figure 7:
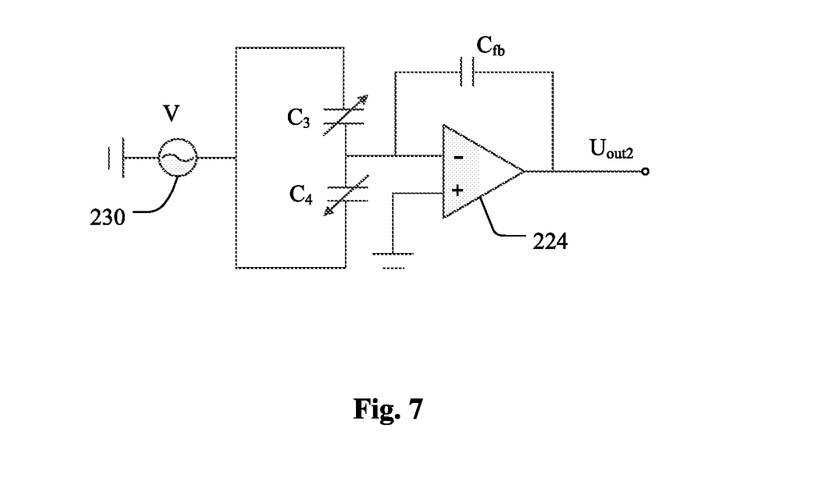
FIG. 7 shows an equivalent circuit diagram of a reference circuit of the MEMS device according to the first embodiment of the present disclosure.

FIG. 6 shows an equivalent circuit diagram of a detection circuit of the MEMS device according to the first embodiment of the present disclosure; FIG. 7 shows an equivalent circuit diagram of a reference circuit of the MEMS device according to the first embodiment of the present disclosure. As shown in FIGS. 3 and 6, the first capacitor $C_1$, the second capacitor $C_2$, the voltage source 230, the first operational amplifier 221, the second operational amplifier 222, the third operational amplifier 223, the first feedback capacitor $C_{fa1}$, and the second feedback capacitor $C_{fa2}$ are connected to form a detection circuit.

Specifically, the commonly used movable electrode plate 215 is connected to the voltage source 230 which provides a high frequency carrier signal; the first electrode plate 211 is connected to an inverting input terminal of the first operational amplifier 221 via the first fixed electrode 211a so that the first capacitor $C_1$ is connected between the voltage source 230 and the inverting input terminal of the first operational amplifier 221; the second electrode plate 212 is connected to an inverting input terminal of the second operational amplifier 222 via the second fixed electrode 212a such that the second capacitor is connected between the voltage source 230 and the inverting input terminal of the second operational amplifier 222. The first feedback capacitor $C_{fa1}$ is connected between the inverting input terminal and the output terminal of the first operational amplifier 221, and the second feedback capacitor $C_{fa2}$ is connected between the inverting input terminal and the output terminal of the second operational amplifier 222. Capacitance values of the first feedback capacitor $C_{fa1}$ and the second feedback capacitor $C_{fa2}$ are equal. The output terminal of the first operational amplifier 221 is connected to an inverting input terminal of the third operational amplifier 223; the output terminal of the second operational amplifier 222 is connected to a non-inverting input terminal of the third operational amplifier 223, and an output terminal of the third operational amplifier 223 is connected to an input terminal of the divider 240.

As shown in FIGS. 3 and 7, the voltage source 230, the third capacitor $C_3$, the fourth capacitor $C_4$, the third feedback capacitor $C_{fb}$, and the fourth operational amplifier 224 are connected to form a reference circuit. Specifically, the commonly used movable electrode plate 215 is connected to the voltage source 230; the third electrode plate 213 is connected to an inverting input terminal of the fourth operational amplifier 224 via the third fixed electrode 213a, and the fourth electrode plate 214 is connected to the inverting input terminal of the fourth operational amplifier 224 via the fourth fixed electrode 214a so that the third capacitor $C_3$ and the fourth capacitor $C_4$ are respectively connected between the voltage source 230 and the inverting input terminal of the fourth operational amplifier 224. The third feedback capacitor $C_{fb}$ is connected between the inverting input terminal and an output terminal of the fourth operational amplifier 224. The output terminal of the fourth operational amplifier 224 is connected to an input terminal of the divider 240.

The detection circuit is used for performing differential detection on the first capacitor $C_1$ and the second capacitor $C_2$; the reference circuit is used for detecting the third capacitor $C_3$ and the fourth capacitor $C_4$, and the divider 240 is used for eliminating a nonlinear relationship between the output voltage of the detection circuit and a displacement of the movable electrode plate.

Specifically, an output voltage $U_{out1}$ at the output terminal of the third operational amplifier 223 is:

$$U_{out1} = U_1 - U_2 = -\left(\frac{C_1}{C_{fa}}V - \frac{C_2}{C_{fa}}V\right)$$

An output voltage $U_{out2}$ at the output terminal of the fourth operational amplifier 224 is:

$$U_{out2} = -\left(\frac{C_3}{C_{fb}}V + \frac{C_4}{C_{fb}}V\right)$$

Wherein, $U_1$ is an output voltage at the output terminal of the first operational amplifier 221; $U_2$ is an output voltage at the output terminal of the second operational amplifier 222; when the movable electrode plate 215 is in the nominal position, the capacitances of the first capacitor $C_1$, the second capacitor $C_2$, the third capacitor $C_3$ and the fourth capacitor $C_4$ are:

$$C_1 = \frac{\varepsilon A_0}{d_0};$$

$$C_2 = \frac{\varepsilon A_0}{d_0};$$

$$C_3 = \frac{\varepsilon A_{01}}{d_0};$$

$$C_4 = \frac{\varepsilon A_{01}}{d_0};$$

wherein, the distance between the first electrode plate 211 and the movable electrode plate 215, the distance between the second electrode plate 212 and the movable electrode plate 215, the distance between the third electrode plate 213 and the movable electrode plate 215, and the distance between the fourth electrode plate 214 and the movable electrode plate 215 are each represented by $d_0$; $A_0$ represents a sum of the overlapped areas between the plurality of first electrode plates 211 and the plurality of movable electrode plates 215, and also represents a sum of the overlapped areas between the plurality of second electrode plates 212 and the plurality of movable electrode plates 215; $A_{01}$ represents a sum of the overlapped areas between the plurality of third electrode plates 213 and the plurality of movable electrode plates 215, and also represents a sum of the overlapped areas between the plurality of fourth electrode plates 214 and the plurality of movable electrode plates 215. It can be seen from the above formula that the capacitances of the first capacitor $C_1$ and the second capacitor $C_2$ are equal; the capacitances of the third capacitor $C_3$ and the fourth capacitor $C_4$ are equal, and the output voltage $U_{out}$ of the divider is 0.

When the movable electrode plate 215 is displaced in the first direction (e.g., the X-axis direction), the distance between the movable electrode plate 215 and the first electrode plate 211, the distance between the movable electrode plate 215 and the second electrode plate 212, the distance between the movable electrode plate 215 and the third electrode plate 213, and the distance between the movable electrode plate 215 and the fourth electrode plate 214 may change, thereby causing the capacitances of the first capacitor $C_1$, the second capacitor $C_2$, the third capacitor $C_3$, and the fourth capacitor $C_4$ to change.

When the movable electrode plate 215, for example, moves close to the first electrode plate 211 by a displacement x, the distance between the movable electrode plate 215 and the first electrode plate 211 is $d_0-x$, and the distance between the movable electrode plate 215 and the third electrode plate 213 is $d_0-x$; meanwhile, the distance between the movable electrode plate 215 and the second electrode plate 212 is $d_0+x$, and the distance between the movable electrode plate 215 and the fourth electrode plate 214 is $d_0+x$; furthermore, the first capacitor $C_1$, the second capacitor $C_2$, the third capacitor $C_3$ and the fourth capacitor $C_4$ are changed in capacitance, specifically:

$$C_1 = \frac{\varepsilon A_0}{d_0 - x};$$

$$C_2 = \frac{\varepsilon A_0}{d_0 + x};$$

$$C_3 = \frac{\varepsilon A_{01}}{d_0 - x};$$

$$C_4 = \frac{\varepsilon A_{01}}{d_0 + x};$$

The output voltage $U_{out1}$ at the output terminal of the third operational amplifier 223 is:

$$U_{out1} = -\left(\frac{\frac{\varepsilon A_0}{d_0 - x}}{C_{fa}}V - \frac{\frac{\varepsilon A_0}{d_0 + x}}{C_{fa}}V\right) = -V\frac{\varepsilon A_0}{C_{fa}}\left(\frac{1}{d_0 - x} - \frac{1}{d_0 + x}\right)$$

The output voltage $U_{out2}$ at the output terminal of the fourth operational amplifier 224 is:

$$U_{out2} = -\left(\frac{\frac{\varepsilon A_{01}}{d_0 - x}}{C_{fb}}V + \frac{\frac{\varepsilon A_{01}}{d_0 + x}}{C_{fb}}V\right) = -V\frac{\varepsilon A_{01}}{C_{fb}}\left(\frac{1}{d_0 - x} + \frac{1}{d_0 + x}\right)$$

The output voltage $U_{out}$ at the output terminal of the divider 240 is:

$$U_{out} = \frac{U_{out1}}{U_{out2}} = \frac{-V\frac{\varepsilon A_0}{C_{fa}}\left(\frac{1}{d_0 - x} - \frac{1}{d_0 + x}\right)}{-V\frac{\varepsilon A_{01}}{C_{fb}}\left(\frac{1}{d_0 - x} + \frac{1}{d_0 + x}\right)} = \frac{A_0 C_{fb}}{A_{01} C_{fa}}\frac{x}{d_0}$$

It can be seen from the above formula that the output voltage $U_{out}$ at the output terminal of the divider 240 is proportional to the displacement distance of the movable electrode plate 215, that is, the output voltage $U_{out}$ of the divider is linear with the displacement of the movable electrode plate 215.

Figure 8:
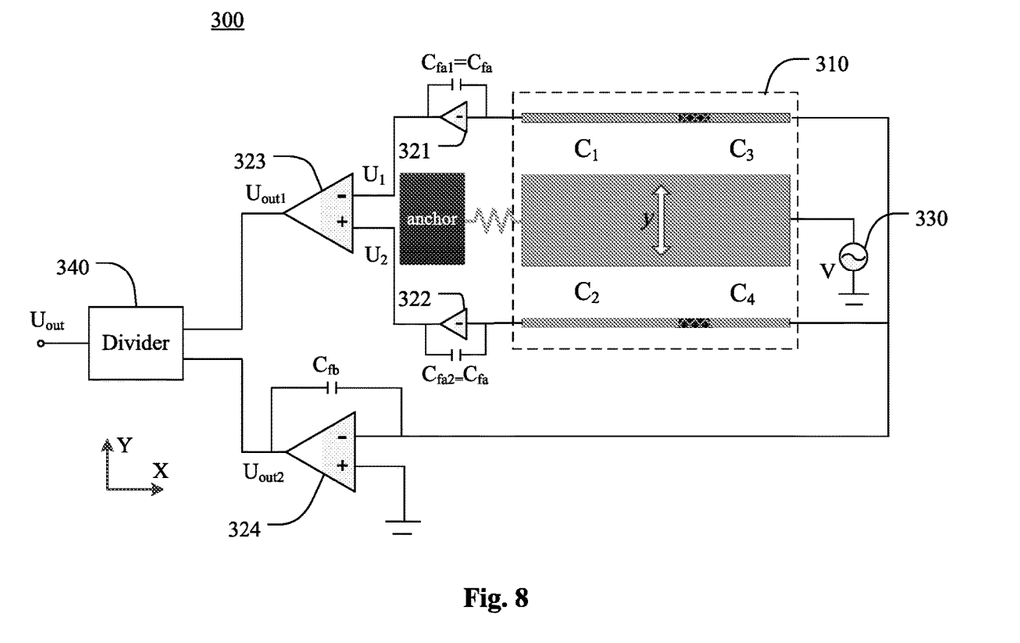
FIG. 8 shows a schematic structural diagram of a MEMS device according to a second embodiment of the present disclosure.

FIG. 8 shows a schematic structural diagram of a MEMS device according to a second embodiment of the present disclosure. As shown in FIG. 8, in this embodiment, the MEMS device 300 includes a "sandwich" type acceleration sensing element 310, a first operational amplifier 321, a second operational amplifier 322, a third operational amplifier 323, a fourth operational amplifier 324, a first feedback capacitor $C_{fa1}$, a second feedback capacitor $C_{fa2}$, a third feedback capacitor $C_{fb}$, a voltage source 330, and a divider 340.

Figure 9:
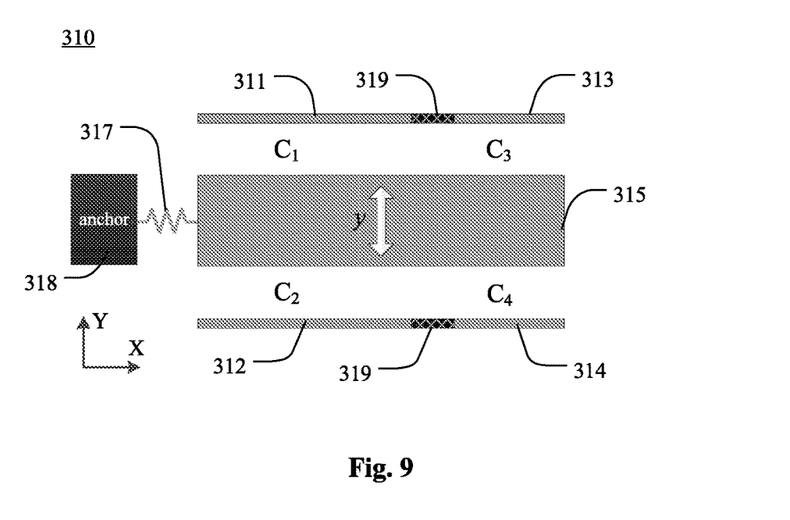
FIG. 9 shows a schematic structural diagram of the MEMS accelerometer sensing element according to the second embodiment of the present disclosure.

FIG. 9 shows a schematic structural diagram of the sensing element 310 of the MEMS accelerometer according to the second embodiment of the present disclosure, in which the sensing element 310 includes a movable electrode plate 315, a first electrode plate 311, a second electrode plate 312, a third electrode plate 313, and a fourth electrode plate 314. The first electrode plate 311 and the third electrode plate 313 are located on one side of the movable electrode plate 315, the second electrode plate 312 and the fourth electrode plate 314 are located on the other side of the movable electrode plate 315, a first capacitor $C_1$ is formed by the first electrode plate 311 and the movable electrode plate 315, a second capacitor $C_2$ is formed by the second electrode plate 312 and the movable electrode plate 315, a third capacitor $C_3$ is formed by the third electrode plate 313 and the movable electrode plate 315, and a fourth capacitor $C_4$ is formed by the fourth electrode plate 314 and the movable electrode plate 315.

Unlike the first embodiment, the first electrode plate 311 and the third electrode plate 313 are isolated by insulating medium 319; the second electrode plate 312 and the fourth electrode plate 314 are isolated by insulating medium 319. The movable electrode plate 315 is connected to an anchor 318 via an elastic beam 317, and when the MEMS device is accelerated in Y-axis direction, the movable electrode plate 315 moves away from the nominal position in the Y-axis direction, so that capacitances of the first capacitor $C_1$, the second capacitor $C_2$, the third capacitor $C_3$ and the fourth capacitor $C_4$ may change.

The voltage source 330, the first capacitor $C_1$, the second capacitor $C_2$, the first operational amplifier 321, the second operational amplifier 322, the third operational amplifier 323, the first feedback capacitor $C_{fa1}$ and the second feedback capacitor $C_{fa2}$ are connected to form a detection circuit. The voltage source 330, the third capacitor $C_3$, the fourth capacitor $C_4$, the third feedback capacitor $C_{fb}$ and the fourth operational amplifier 324 are connected to form a reference circuit. An output terminal of the detection circuit and an output terminal of the reference circuit are connected to the divider 340. Connection configuration of the detection circuit and the reference circuit may be the same as that of the first embodiment, thus will not be described in this embodiment here.

In the above embodiments, each MEMS device may be a MEMS accelerometer, wherein the MEMS accelerometer can be equivalent to a parallel plate capacitor including a detection capacitor (the first capacitor and the second capacitor) and a reference capacitor (the third capacitor and the fourth capacitor). In other embodiments, the MEMS device may also be any other MEMS device, such as a MEMS gyroscope or the like, that may be equivalent to a parallel plate capacitor including a detection capacitor (the first capacitor and the second capacitor) and a reference capacitor (the third capacitor and the fourth capacitor).

Figure 10:
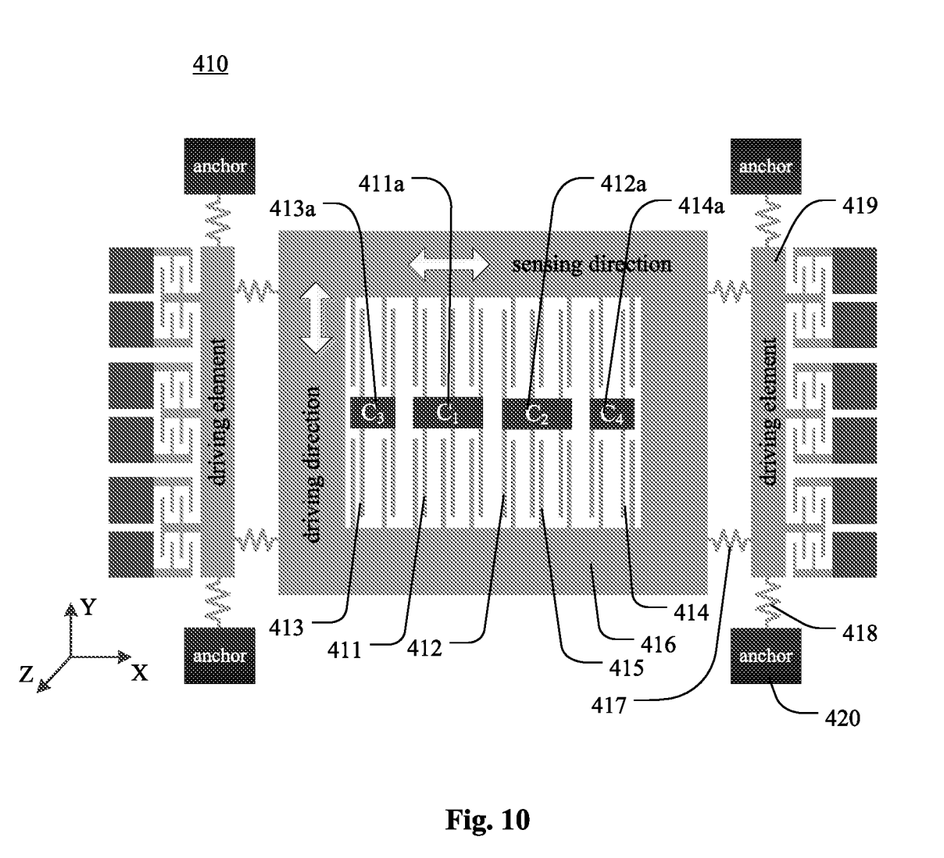
FIG. 10 shows a structural schematic diagram of a MEMS sensing element of a gyroscope.

FIG. 10 shows a schematic structural diagram of a MEMS sensing element of a gyroscope 410 including a movable electrode plate 415, a first electrode plate 411, a second electrode plate 412, a third electrode plate 413, and a fourth electrode plate 414.

In this embodiment, the movable electrode plate 415, the first electrode plate 411, the second electrode plate 412, the third electrode plate 413 and the fourth electrode plate 414 can be arranged in a same manner as in the first embodiment, that is, the first capacitor $C_1$ may be formed by the first electrode plate 411 and the movable electrode plate 415, the second capacitor $C_2$ may be formed by the second electrode plate 412 and the movable electrode plate 415, the third capacitor $C_3$ may be formed by the third electrode plate 413 and the movable electrode plate 415, the fourth capacitor $C_4$ may be formed by the fourth electrode plate 414 and the movable electrode plate 415, and the first capacitor $C_1$ and the second capacitor $C_2$ are connected to the detection circuit. The third capacitor $C_3$ and the fourth capacitor $C_4$ may be connected to the reference circuit based on a connection configuration same as that of the first embodiment, which will not be described in detail in this embodiment.

Different from the first embodiment, in this second embodiment, there are a plurality of movable electrode plates 415, which are fixedly connected to the movable mass 416. Further, the movable mass 416 is an annular mass and the plurality of movable electrode plates 415 are fixed to two opposite inner sidewalls of the annular movable mass 416. Further, the movable mass 416 is connected to a driving element 419 through an elastic beam 417, two ends of the driving element 419 are connected to an anchor 420 through an elastic beam 418, and the driving element 419 drives the mass 416 to vibrate harmonically in the resonant frequency in the Y-axis direction as shown in the figure under a driving force. When an angular velocity in the Z-axis direction is input, Coriolis force in the X-axis direction is generated to cause the movable mass 416 and the movable electrode plate 415 to leave the nominal position, thereby generating a displacement x in the X-axis direction.

When there is no angular velocity input, the movable mass and the movable electrode plate are in an nominal position in X-axis direction, capacitances of the first capacitor $C_1$ and the second capacitor $C_2$ are equal, and for example, equal to $C_0$; the number of the third electrode plates 413 is equal to the number of the fourth electrode plates 414, and the third capacitor $C_3$ and the fourth capacitor $C_4$ are equal in capacitance when the movable mass 416 is in the nominal position in X-axis direction. When there is an angular velocity input in Z-axis direction, the movable mass 416 may produce a displacement x in the X-axis direction under Coriolis force. The first capacitor $C_1$, the second capacitor $C_2$, the third capacitor $C_3$ and the fourth capacitor $C_4$ are all changed in capacitance.

The first capacitor $C_1$ and the second capacitor $C_2$ are connected to the detection circuit. The third capacitor $C_3$ and the fourth capacitor $C_4$ are connected to the reference circuit. An output terminal of the detection circuit and an output terminal of the reference circuit are connected to the divider. Connection configuration of the detection circuit and the reference circuit may be the same as that of the first embodiment, and will not be described in this embodiment here.

In accordance with embodiments of the present disclosure, as described above, these embodiments are not exhaustively described in all detail nor are the present disclosure limited to the specific embodiments described. Obviously, according to the above descriptions, many modifications and changes can be made. These embodiments are selected and specifically described in this specification in order to better explain principles and practical applications of the present disclosure, thereby enabling those skilled in the art to make good use of the present disclosure and modifications based on the present disclosure. The invention is limited only by the claims and their full scope and equivalents.

What is claimed is:

1. A MEMS device, comprising:
a movable electrode plate;
a first electrode plate and a third electrode plate, both of which are located on a first side of the movable electrode plate, wherein a first capacitor is formed by the first electrode plate and the movable electrode plate, and a third capacitor is formed by the third electrode plate and the movable electrode plate; and
a second electrode plate and a fourth electrode plate, both of which are located on a second side of the movable electrode plate, wherein a second capacitor is formed by the second electrode plate and the movable electrode plate, and a fourth capacitor is formed by the fourth electrode plate and the movable electrode plate;
wherein the first capacitor and the second capacitor are coupled to a detection circuit, and the detection circuit is configured to perform differential detection on the first capacitor and the second capacitor;
wherein the third capacitor and the fourth capacitor are coupled to a reference circuit, and the reference circuit is configured to detect the third capacitor and the fourth capacitor;
wherein an output terminal of the detection circuit and an output terminal of the reference circuit are connected to an input terminal of a divider, which is configured to eliminate nonlinear relationship between an output voltage of the detection circuit and a displacement distance of the movable electrode plate.

2. The MEMS device according to claim 1, wherein the distance between the first electrode plate and the movable electrode plate, the distance between the second electrode plate and the movable electrode plate, the distance between the third electrode plate and the movable electrode plate, and the distance between the fourth electrode plate and the movable electrode plate are equal when the movable electrode plate is in a nominal position.

3. The MEMS device according to claim 1, wherein the first electrode plate and the second electrode plate has an equal overlapped area with the movable electrode plate; and the third electrode plate and the fourth electrode plate has an equal overlapped area with the movable electrode plate.

4. The MEMS device according to claim 2, wherein the first electrode plate and the second electrode plate has an equal overlapped area with the movable electrode plate; and the third electrode plate and the fourth electrode plate has an equal overlapped area with the movable electrode plate.

5. The MEMS device according to claim 1, wherein the detection circuit comprises:
- a first operational amplifier, having an inverting input terminal connected to the first electrode plate;
- a second operational amplifier, having an inverting input terminal connected to the second electrode plate;
- a third operational amplifier, having a non-inverting input terminal, an inverting input terminal and an output terminal, wherein the non-inverting input terminal of the third operational amplifier is connected to an output terminal of the second operational amplifier, the inverting input terminal of the third operational amplifier is connected to an output terminal of the first operational amplifier, and the output terminal of the third operational amplifier is connected to the input terminal of the divider; and
- a first feedback capacitor, coupled between the inverting input terminal and the output terminal of the first operational amplifier;
- a second feedback capacitor, coupled between the inverting input terminal and the output terminal of the second operational amplifier;
- wherein, capacitance values of the first feedback capacitor and the second feedback capacitor are equal.

6. The MEMS device according to claim 1, wherein the reference circuit comprises:
- a fourth operational amplifier, having an inverting input terminal connected to the third electrode plate and the fourth electrode plate, and having an output terminal connected to the divider; and
- a third feedback capacitor, coupled between the inverting input terminal and the output terminal of the fourth operational amplifier.

7. The MEMS device according to claim 5, further comprising a voltage source, connected to the movable electrode plate for supplying a voltage to the first capacitor, the second capacitor, the third capacitor, and the fourth capacitor.

8. The MEMS device according to claim 6, further comprising a voltage source, connected to the movable electrode plate for supplying a voltage to the first capacitor, the second capacitor, the third capacitor, and the fourth capacitor.

9. The MEMS device according to claim 1, wherein the first electrode plate and the third electrode plate are separated from each other or connected through an insulating medium.

10. The MEMS device according to claim 1, wherein the second electrode plate and the fourth electrode plate are separated from each other or connected through an insulating medium.

11. The MEMS device according to claim 1, wherein the MEMS device is a MEMS accelerometer.

12. The MEMS device according to claim 1, wherein the MEMS device is a MEMS gyroscope.

* * * * *